(12) United States Patent
Muzicant et al.

(10) Patent No.: US 7,242,864 B2
(45) Date of Patent: Jul. 10, 2007

(54) TECHNIQUE FOR POWER CONTROL IN OPTICAL NETWORKS

(75) Inventors: Tal Muzicant, Givataim (IL); David Harris, Jerusalem (IL)

(73) Assignee: ECI Telecom Ltd., Petach Tikva (IL)

( * ) Notice: Subject to any disclaimer, the term of this patent is extended or adjusted under 35 U.S.C. 154(b) by 562 days.

(21) Appl. No.: 10/756,495

(22) Filed: Jan. 14, 2004

(65) Prior Publication Data

US 2004/0146306 A1 Jul. 29, 2004

(30) Foreign Application Priority Data

Jan. 14, 2003 (IL) .................................. 153941

(51) Int. Cl.
| | |
|---|---|
| H04B 10/08 | (2006.01) |
| H04B 10/00 | (2006.01) |
| H04B 10/04 | (2006.01) |
| H04J 14/02 | (2006.01) |

(52) U.S. Cl. .................... 398/37; 398/94; 398/160; 398/197

(58) Field of Classification Search ............... 398/15, 398/25, 31, 33, 37, 34, 94, 83, 160, 177, 398/197; 359/337.1, 337.11
See application file for complete search history.

(56) References Cited

U.S. PATENT DOCUMENTS 6,072,601 A 6/2000 Toyohara
6,275,329 B1 8/2001 Sieben
2002/0081064 A1 6/2002 Leng et al.
2002/0114062 A1* 8/2002 Simard et al. .............. 359/337
2004/0086279 A1* 5/2004 Sakamoto et al. .......... 398/177

FOREIGN PATENT DOCUMENTS

| EP | 0 942 548 A2 | 9/1999 |
|---|---|---|
| EP | 1 006 682 A2 | 6/2000 |
| WO | WO 99/21302 A1 | 4/1999 |
| WO | WO 02/091027 A2 | 11/2002 |
| WO | WO 03/021835 A2 | 3/2003 |

* cited by examiner

*Primary Examiner*—Dalzid Singh
(74) *Attorney, Agent, or Firm*—Browdy and Neimark, PLLC (57) ABSTRACT

A technique for maintaining a required value of power per optical communication channel in a chain of optical nodes (112, 114, 118, 116) connected by optical fiber spans (111, 119, 121), wherein at least some of the nodes include optical amplifiers (112, 114, 116) with controllable gains, the technique comprises performing automatic gain control at the optical amplifiers so that, in the frame of power gain of each particular optical amplifier (114, 116), to compensate a preceding span loss. The span loss is calculated as power loss on an optical fiber span (111,121) incoming the particular amplifier.

17 Claims, 2 Drawing Sheets

TECHNIQUE FOR POWER CONTROL IN OPTICAL NETWORKS

FIELD OF THE INVENTION

The present invention relates to a technique for controlling and regulating the power level of optical signals transmitted in an optical telecommunication network both in the regular regime, and in cases of fiber cut and span attenuation changes.

BACKGROUND OF THE INVENTION

There are a number of problems known in the field of optical communications, which concern regulating power of multi-channel optical transmission.

In advanced network configurations, sites can possibly contain either optical amplifiers or Optical Add Drop Multiplexers (OADM), or both. An optical trail may start and terminate at any site according to a customer's use. For example, due to the fact that OADM is capable of dropping and adding optical channels, some trails may start or terminate at the add/drop ports of OADM and the number of optical channels in spans before and after OADM may differ significantly. In such configurations, a fiber cut in a span/section beyond the end points of a specific optical trail must not have any effect on the performance of such an optical trail. Some control systems handling optical transmission in the advanced network configurations take care of the above problem.

Some of the presently used systems for DWDM networks introduce a so-called channel count mechanism. This mechanism transmits the number of active channels in the link to all the amplifiers in that link so they can modify their output power accordingly. In order to maintain balance in such a system, the number of channels dropped at a particular node should be approximately equal to the number of channels added at this node. However, such a mechanism reacts incorrectly to events such as a fiber cut in a specific span of a link with OADMs (Optical Add Drop Multiplexers). Indeed, a fiber cut drastically changes the actual number of channels at more than one successive nodes, so the output power of the amplifiers in the link will not be correctly adjusted. The erroneous adjustment will most likely cause a degradation in optical performance of the system.

U.S. Pat. No. 6,072,601 describes an optical fiber amplifier capable of determining a number of optical channels actually inputted to it, thereby allowing, through self-control, both optimum operation conditions in accordance with the number of transmission channels, and the maintenance of the transmission performance. The optical fiber amplifier comprises an optical signal amplifier and a control circuit. The control circuit section comprises a branch circuit that branches off and extracts a portion of the transmitted optical signal power, and a channel counter that inputs a portion of the branched optical signal power and based on that counts the number of channels of the transmitted optical signals. The control circuit controls the amplification factor of the optical signal amplifier in accordance with the number of channels counted at the channel counter. The system counts the channels on the ad-hoc basis but is unable to predict the number of active optical channels in case of a fiber cut, which would be important to prevent ill effects of transient periods in the network until the channel count mechanism is updated.

WO 9921302 A1 relates to a method for controlling the output power of an optical amplifier in a node in a network, wherein the output power of the amplifier is controlled via a pump laser in a control circuit. The node reads a supervisory channel OSC comprising information on how to control the amplifier, and then uses the information for the control of the amplifier. The mentioned information comprises the number of channels coming into the node. Also, input power to the amplifier is monitored and, if it is changed more than a certain limit, further change of the amplifier control is withhold up to receiving a reliable number of the optical channels.

U.S. Pat. No. 6,275,329 describes a method and apparatus for amplifying an optical signal in an optical network. The optical amplifying module comprises a variable optical attenuator (VOA), an optical amplifier and a controller, which are coupled to each other and to the optical network. The VOA attenuates the optical input signal to produce an attenuated output signal. The optical amplifier amplifies the latter signal to produce an amplified output signal. The controller receives some network operating parameters and also monitors the power levels of the attenuated and the amplified signals. Based on the measured power levels and the received operating parameters the controller adjusts the VOA such that the optical output power per channel is maintained at a constant value.

Neither of the presently known systems allows simply and suitably adapting power control in an optical network to different types of faults, for example reacting adequately to a fiber cut and/or a fiber degradation due to fiber bend or fiber aging.

Modern networks, which are to satisfy requirements of the standards accepted in the field, should provide fast reactions to faults in order to ensure the traffic non-effecting operation. For example, a fiber cut in a telecommunication link should be detected and isolated during no more than 50 ms.

Presently, there is no known methods/systems that simply and operatively detect faults and adjust power in an optical communication system so, that occurrence of a fiber degradation would not lead to the system unbalancing.

A co-pending Applicant's patent application U.S.-2003-0046293-A1 (WO 03/021835 A2) describes a method of real time control of power per optical channel in a multi-channel optical communication line formed by a group of optical elements connected in a chain by fiber spans, the method comprises calculating, for a particular optical amplifier in the line, an expected total input power value EIP, measuring a real total input power MIP at said particular optical amplifier, and, if a difference between the EIP and the MIP exceeds a predetermined value, adjusting the amplifier's gain to maintain its output power per channel constant. The EIP value is calculated using up-to date values of NOC (number of active optical channels) and NOA (number of preceding optical amplifiers in the line). That solution requires preliminary calculations for obtaining NOC, NOA, EIP for providing a reaction to changes in the line.

The mentioned above documents are hereby incorporated by reference.

OBJECT OF THE INVENTION

It is therefore the main object of the present invention to provide a method and a system for controlling power in optical communication networks comprising optical amplifiers and OADMs, which would ensure maximally operative and simple power control both in normal regimes of operation and in cases of faults.

SUMMARY OF THE INVENTION

Speaking more technically, the purpose is maintaining a required value of power per channel for active channels in an optical network both in the regular operation, and in cases of fiber cut or fiber degradation.

It has been realized by the Inventors that to maintain once selected power per channel in a chain comprising optical amplifiers and optical fiber spans, each amplifier must have such a gain to compensate power loss on the preceding optical fiber span (so-called span loss) between the amplifier and its preceding amplifier. In other words, if an amplifier in the chain can be adapted to maintain the gain equal to the preceding span loss, the selected power per channel will automatically be maintained. Further, it should be recalled that power loss on a span incoming a particular amplifier is reflected by a difference between output power of the preceding amplifier and input power of the particular amplifier.

For maintaining a required value of power per optical channel in a chain of optical nodes connected by optical fiber spans, wherein at least some of said nodes being optical amplifiers with controllable gains, the Inventors propose a method comprising performing automatic gain control at said optical amplifiers based on:

obtaining information from a preceding node in the chain, wherein the information reflects at least a value of measured output power (MOP) of the preceding node,
  measuring input power (MIP) at the following node,
  obtaining a difference between the MOP of the preceding node and the MIP at the following node to calculate the exact span loss between the two nodes,
  wherein the automatic gain control is performed at the amplifier of the following node in response to the calculated span loss.

It should be noted that knowing the exact number of channels active in the preceding span is unimportant for the proposed method, i.e., whatever input power occurs at a node, it will be amplified with the gain controlled in response to the span loss (the difference between MOP and MIP). Likewise, in case a power loss change occurs before the optical amplifier (for example, either excessive power loss due to the fiber degradation or bending, or to the contrary, improvement of the fiber transmission parameters owing to unbending the fiber), the amplifier's gain will be changed accordingly and automatically, owing to the change in the difference between MOP and MIP.

The proposed method is therefore advantageous over the known techniques, for example over those requiring to know the number of active optical channels (NOC) for calculating output power suitable for the case. The advantages of the method are:

1. The method allows automatic configuration of the amplifier chain by simply connecting the fiber. Upon performing an initial calibration of the required output power per channel at the first amplifier in the chain all other amplifiers in the chain need only to be connected to the fiber and they will automatically calibrate to the correct gain values. This frees the network installation personnel from the need to calibrate and re-calibrate the network repeatedly going from site to site with all the necessary monitoring equipment until the network is stabilized.

2. Automatic gain control without calculating NOC (number of channels), such a gain control also enables tracking and compensating the fiber problems;
3. Simple communication protocol, where one (maximum, two) parameters are transmitted from one node to another;
4. The parameters transmitted present simple and reliable information;
5. Real time handling of cases of added/dropped channels, fiber degradation, etc.

As has been mentioned, when power loss before an optical amplifier changes, the amplifier's gain will be changed to compensate either the excessive signal attenuation caused by the degradation, or (to the contrary) the excessive signal growth due to decrease of attenuation only upon receiving updated information regarding the output power of the previous node to verify that the attenuation has in fact changed.

However, in such a chain it may occur that one or more of the amplifiers are not capable of providing the full compensation to the span loss preceding it for several reasons including:

a. The span loss preceding the amplifier is larger than the maximum gain the amplifier is capable of;
  b. An amplifier with different specifications (less output power for instance);
  c. A faulty amplifier.

In such cases, nodes following such an amplifier should be caused to and be capable of participating in the task of compensating the span power losses in the chain, thereby ensuring the power control per channel in the chain.

Another complication may be introduced if the chain comprises not only optical amplifiers, but also one or more OADMs (Optical Add Drop Multiplexers). OADM positioned between two amplifiers introduces its own insertion loss (or so-called through channel attenuation TCA) in the fiber span, and may change the active number of channels in the span since the number of dropped channels sometimes is not equal to the number of added channels.

The chain should be understood as a succession of optical elements (nodes) preferably including optical amplifiers, one or more OADM and, possibly, other passive optical network elements, connected by optical fiber spans and switched between two end points to ensure multi-channel optical transmission via the chain.

A further idea of the present invention is to share the responsibility of compensating power loss changes, caused by degradation/improvement of one or more optical spans, between a number of amplifiers in the chain, while ensuring proper reaction of the chain nodes to cases of fiber cut.

To implement the above idea, the step of obtaining information may further comprise obtaining a value of accumulated non-compensated power loss at the preceding node ($\Delta PL$), and transmitting said fulfilled information from a preceding node to its following node in the chain (or to a central processor), the method thereby ensuring distributed compensation of power loss changes if occur in one or more spans of the chain.

It should be noted, that the method (with or without obtaining $\Delta PL$) preferably comprises a step of preliminary calibration of power per optical channel at the first amplifier in the chain; methods of calibration are known to those skilled in the art and are not discussed in the frame of this patent application.

The proposed method can be implemented by performing the following steps for an intermediate node "i" of the chain:

receiving information on two parameters MOP(i−1) and ΔPL(i−1) from the preceding node "i−1", the MOP(i−1) being Measured Output Power of the preceding node, and ΔPL(i−1) being Power Loss which has not been compensated at the preceding node;

measuring parameter MIP(i) being Measured Input Power of the node "i", processing the parameters MOP(i−1), ΔPL(i−1) and MIP(i) to obtain a non-compensated power loss accumulated before the node "i":

NCPLi=ΔPLi−1+(MOPi−1−MIPi);

in case the node "i" is an optical amplifier, controlling its gain so as to at least partially compensate the obtained non-compensated power loss accumulated before the node "i"(NCPLi), producing two parameters MOPi and ΔPLi to be used for the next node "i+1", wherein MOPi is Measured Output Power of the node "i", and ΔPLi is Power Loss which has not been compensated at the node "i".

The operations of obtaining the information of MOP and of the gain control can be performed on the basis of periodical monitoring and by using pre-selected thresholds, so as to prevent excessive sensitivity of the system. For example, values of MOP can be measured periodically to confirm that there is a valuable MOP, and more often only in cases the MOP changes over a pre-selected threshold; the gain of a node can be left unchanged if the change of the power loss NCPLi between two successive monitoring sessions is no more than ±0.5 dB. Moreover, a so-called hold off time can optionally be selected to delay reaction of the node in order to recheck the changes thereby preventing excessive fluctuations in the chain.

Owing to the fact that amplifiers of the chain compensate any power loss changes (if occur), the proposed method ensures that any changes in a number of optical channels are automatically reacted to without calculating the number of channels. In other words, upon preliminary calibration of power per channel in the chain, the method enables preserving the calibrated power per channel automatically, also in cases when optical channels are added/dropped so the number of channels in some spans of the chain changes. Reaction of the nodes will actually depend on the input power proportional to the output power of the preceding node and regardless a number of incoming channels, since any changes in the span attenuation, should they distort the correct proportion, would be compensated.

The mentioned information (messages) concerning the power loss values, can be sent between the nodes, and are preferably transmitted via OSC (Optical Supervisory Channel). However, the communication can be organized through other means of transferring data, for example in a centralized manner via a Network Management System (NMS) that may also perform the processing.

If amplifiers having different parameters are used in the network (say, the amplifiers provide different values of the maximal output power, and have different gains), and if a specific power per channel value is required at a particular node, additional measures can be taken.

For extra control of the amplifier chain, an additional local parameter can be used for each amplifier. For instance, when a node being optical amplifier is required to add/reduce the power per channel relative to the power per channel at the output of the previous amplifier, its gain can be changed by a particular extra gain value ΔGV relative to the span attenuation it compensates for.

In this case, the step of controlling the gain of the amplifier comprises changing it in the frame of its gain range so as to at least partially cover a gain sum (NCPLi+ΔGV), and the step of producing the parameter ΔPLi comprises considering the ΔPLi to be equal to a portion of said gain sum not covered by the change of the amplifier's gain.

As has been mentioned, the chain may comprise not only nodes being amplifiers, but also nodes being OADMs.

If the node "i" is OADM which is unable to provide power loss compensation, the parameter ΔPLi will be considered equal to value NCPLi+TCA, wherein TCA is a through-channels' attenuation or internal attenuation of the OADM.

There is a new requirement which is set by the Inventors and preferably implemented in the proposed technique as an additional step: adjusting power of add channels of OADM being node (i), in response to NCPLi (non compensated power loss) before the OADM.

Power of add channels of OADMs should be calibrated once at the beginning of the work, and then adjusted when a non-compensated power loss accumulates before a particular OADM.

According to one preferred version of the method, the step of adjusting power of add channels of OADM comprises comparing the obtained value NCPLi with a reference value of NCPLi. Preferably, the reference value of NCPLi is NCPLi(t−1) obtained at a preceding monitoring session.

Adjustment of the add channels is also to be provided using pre-selected thresholds, and based on a periodic monitoring. For example, if the difference NCPLi−NCPLi(t−1) is no more than ±1 dB, no adjustment is required at the time moments when it is supposed.

Preferably, the method also comprises the following steps when a fiber cut is detected in a particular fiber span:

if the fiber cut is detected in the incoming fiber span of a node being amplifier, switching it off and sending a signal Loss Of Signal (LOS) instead of MOP;

if the fiber cut is detected in the incoming fiber span of a node being OADM, leaving its add channels as adjusted in the previous monitoring session.

Determining the condition of fiber cut may, for example, be based on measuring MIP<MIPmin.

It is understood that if the fiber cut is detected before an amplifier but not in its incoming fiber span, such an amplifier will either switch off when receiving LOS from the previous amplifier, or act based on MOP received from the preceding OADM or an amplifier following the OADM.

According to a second aspect of the invention, there is also provided a system capable of maintaining a required power per optical channel in an optical chain according to the proposed method, by performing automatic gain control at any optical amplifier of the chain to compensate a span loss in a fiber span preceding the optical amplifier.

For example, a system for maintaining a required value of power per optical channel in a chain of optical nodes connected by optical fiber spans, wherein at least some of said nodes being optical amplifiers with controllable gains, may be capable of performing automatic gain control at said optical amplifiers and operative to:

obtain information from a preceding node in the chain, wherein the information reflects at least a value of measured output power (MOP) at the preceding node, measure input power (MIP) at the following node, obtain a difference between the MOP and the MIP to calculate the span loss, wherein the automatic gain control being performed at the amplifier of the following node in response to the calculated span loss.

In one particular embodiment, there is proposed a system for power control in an optical chain comprising nodes connected by optical fiber spans, wherein the nodes comprise optical amplifiers having gains controllable within respective gain ranges, and one or more Optical Add Drop Multiplexers (OADM) capable of regulating power of add channels according to power of incoming channels, wherein an intermediate node "i" being operative to:

receive information on two parameters MOPi−1 and ΔPLi−1 from the preceding node "i−1", the MOPi−1 being Measured Output Power of the preceding node, and ΔPLi−1 being Power Loss which has not been compensated at the preceding node;

measure parameter MIPi being Measured Input Power of the node "i", process the parameters MOPi−1, ΔPLi−1 and MIPi at the node"i" to obtain a non-compensated power loss accumulated before the node "i":

$$NCPLi=\Delta PLi-1+(MOPi-1-MIPi);$$

in case the node "i" is an optical amplifier, to control its gain within its range so as to at least partially compensate the obtained non-compensated power loss accumulated before the node "i"(NCPLi), to produce two parameters MOPi and ΔPLi to be sent to the next node "i+1", wherein MOPi is Measured Output Power of the node "i", and ΔPLi is Power Loss which has not been compensated at the node "i", said system thereby enabling distributed compensation of power loss changes occurred in one or more of said fiber optic spans.

As has been mentioned, the intermediate node, being an optical amplifier, is operative to compensate the non-compensated power loss by controlling the gain of the node.

However, if the amplifier is required to provide a specific output power value in the frame of its gain range, a system may be capable of pre-setting an extra gain value ΔGV at a particular amplifier node. The node will then be operative to control (usually, to rise) the gain of the amplifier so as to at least partially cover a gain sum (NCPLi+ΔGV), and operative to produce the parameter ΔPLi being equal to a portion of said gain sum not covered by the change (usually, by the increase) of the amplifier's gain.

The invention will be described in further details as the description proceeds.

BRIEF DESCRIPTION OF THE DRAWINGS

The invention will further be described with reference to the following non-limiting drawing, in which.

DETAILED DESCRIPTION OF THE PREFERRED EMBODIMENT

To explain the invention in more detail, let us consider any two adjacent nodes in the optical chain. Let we have the $1^{st}$ or preceding node and the $2^{nd}$ or present node. Each of the nodes is either an optical amplifier or OADM. The $1^{st}$ node receives an optical signal from a preceding node via a $1^{st}$ optical span, and is connected to $2^{nd}$ node via a $2^{nd}$ optical span. As mentioned, any of the nodes may constitute an amplifier having its gain that can be regulated up to its maximal gain, or an OADM which does not have a gain while has a capability to regulate power of add channels according to power of incoming channels. A real chain may comprise passive elements which just pass there-through both the information channels and the supervisory channel of the optical transmission; such elements will be considered portions of optical fiber spans, and not the nodes. Nodes may either have embedded processors, or use a centralized one.

The $1^{st}$ node should be capable to send two kinds of messages to the $2^{nd}$ node (or to a central processor, say located at NMS):

a) A message about the measured output power (MOP1) at the output of the $1^{st}$ node;

b) A message about a change in power loss (ΔPL1) which has not been corrected at the $1^{st}$ node, the meaning of this message is the following:

ΔPL1≠0, if a power loss changed (say, due to the fiber degradation) before the $1^{st}$ node, but the $1^{st}$ node, being an amplifier, was unable to compensate it (at all or completely) by the change of its gain, ΔPL1≠0, if the $1^{st}$ node, being an amplifier, was required to change its gain (say, to provide an extra gain value ΔGV1) but has been unable to rise its gain so as both to provide the required extra gain, and to compensate the power loss change occurred before the $1^{st}$ node, ΔPL1≠0, if the power loss change occurred before the $1^{st}$ node, but the $1^{st}$ node, being OADM, could not correct it;

ΔPL1=0, when power loss change and/or extra gain value requirement either do not exist for the $1^{st}$ node, or were successively compensated/satisfied at the $1^{st}$ node.

The $2^{nd}$ node with its processor (or the central processor at the NMS) should be operative to:

a) receive the messages from the $1^{st}$ node, and to measure the input power (measured input power MIP2) at the input of the $2^{nd}$ span to the $2^{nd}$ node;

b) obtain the difference MOP1−MIP2, thus obtaining the actual power loss on the $2^{nd}$ span;

c) obtain the value NCPL2=[ΔPL1+(MOP1−MIP2)] being the power loss to be compensated at the $2^{nd}$ node;

d) consider extra gain value ΔGV, if required for the $2^{nd}$ node being an amplifier, by obtaining a gain sum GS:

$$GS=NCPL2+\Delta GV2=[\Delta PL1+(MOP1-MIP2)+\times GV2]$$

e) optionally, the processor (of the node or the central one) may compare the difference NCPL2 with the value [NCPL2]t−1, thereby obtaining the actual change of power loss on the $2^{nd}$ span, if such occurred, either for producing alarms or for adjusting OADM add channels;

f) if the $2^{nd}$ node is an amplifier, ensure, at least partially: compensation of the total power loss accumulated up to the $2^{nd}$ node, and the required change of the gain: [ΔPL1+(MOP1−MIP2+ΔGV2)]=GS, all by the gain control;

g) if the $2^{nd}$ node is OADM, ensure adjusting add channels by the value [ΔPL1+(MOP1−MIP2)]−[ΔPL1+(MOP1−MIP2)]t−1, to equalize power per channel of the add channels with that of the input channels;

h) if the $2^{nd}$ node is an amplifier, ensure transmitting the portion the gain sum which could not be compensated/ ensured (either due to the fact that the node is OADM, or due to the gain limit of the node-amplifier) from the $2^{nd}$ node as a message ($\Delta PL2$) to the next node (or to the central processor);

i) if the $2^{nd}$ node is OADM, $\Delta PL2=[\Delta PL1+(MOP1-MIP2)+TCA]$ j) ensure transmitting the measured value of the output power of the $2^{nd}$ node as a message MOP2 to the next node (or to the central processor).

It should be noted that in the simplest case, the method of maintaining the required power per channel is applied to an optical chain where the nodes are only optical amplifiers. In this simplest case, the parameter $\Delta PL$ might be either not transmitted or neglected, TCA=0, $\Delta GV$ may also be equal to 0, so the gain of each node will be controlled based on the following gain sum: GS=MOP(i−1)−MIP(i), in other words in response to the actual span loss.

The above-described algorithm can be graphically illustrated.

Figure 1:
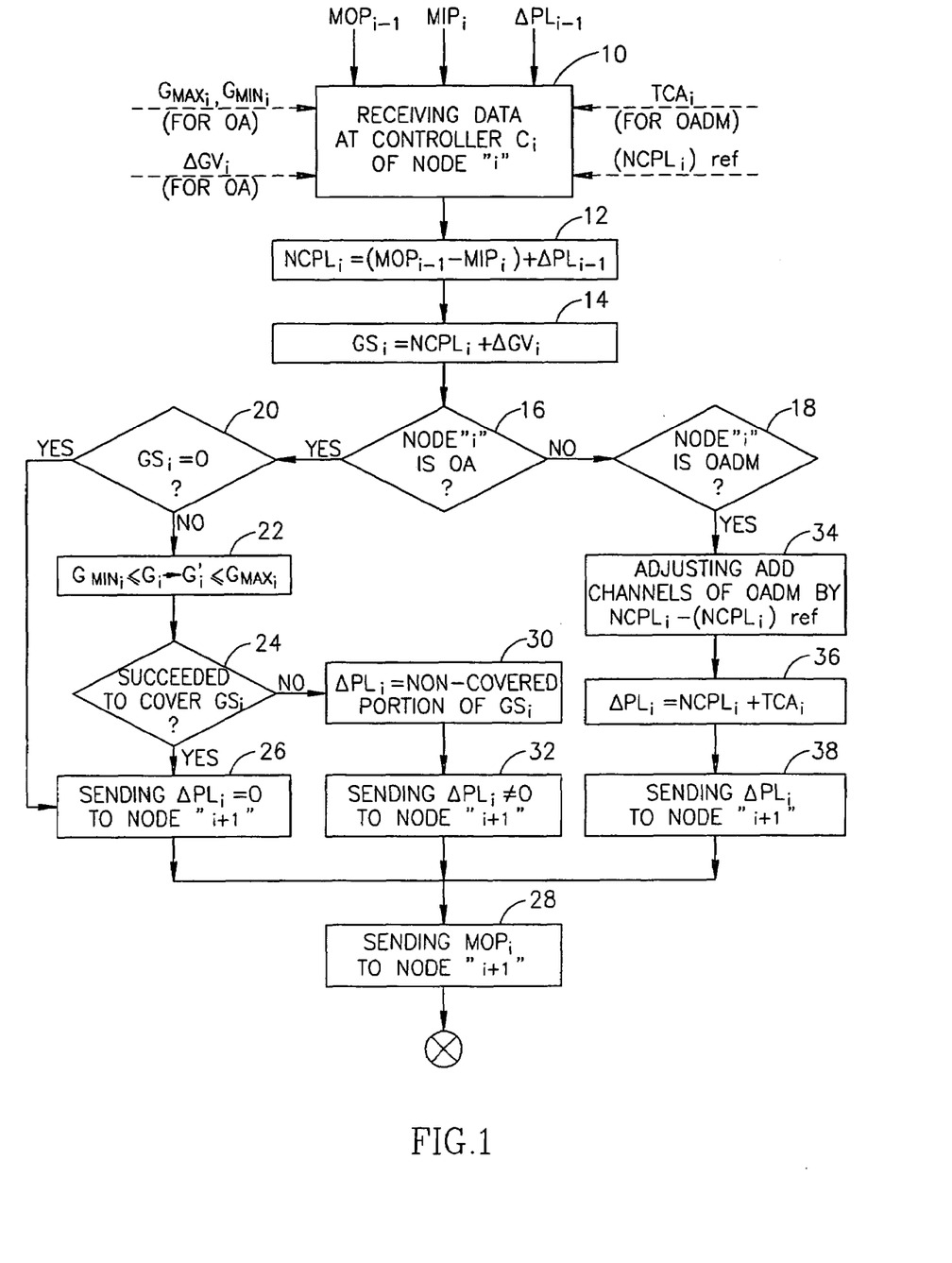
FIG. 1 illustrates a schematic flow chart of power control in an optical chain, based on a version of the proposed method with forwarding messages via the optical chain.

FIG. 1 is a schematic flow chart diagram presenting the algorithm of processing which is performed in an embedded controller Ci of node (i).

Block 10 of the flow chart states that the controller Ci of node (i), having the same structure both for amplifiers and for OADMs, should be informed about the following parameters:

Gi max—maximal gain of the node (if the node is amplifier), and

Gi min—minimal gain of the amplifier;

$\Delta PL(i-1)$—excessive power loss which has not been corrected at the preceding node (i−1);

MIP(i)—measured input power at the node (i);

MOP(i−1)—measured output power at the preceding node (i−1);

$\Delta GVi$—extra gain value which may be required from node (i) in case it is an amplifier; for OADM, $\Delta GVi$ is always zero.

TCAi—through channels' attenuation value for node (i) in case it is OADM; for amplifiers, TCAi=0.

(NCPLi)ref—a reference value, will become understood from the further description.

The parameters MOP(i−1) and $\Delta PL(i-1)$ are received from the preceding node, preferably via the optical supervisory channel. Parameter MIP(i) is measured at the node "i". All the remaining parameters are unique for the node "i" and are either entered at the beginning (TCA, Gmax, Gmin, $\Delta GVi$), or updated during the operation ($\Delta GVi$, NCPLiref).

Block 12 illustrates an operation which is performed at the controller Ci to determine the power loss which has taken place in the optical chain before the node (i): both in the span preceding the node (i) and indicated as [(MOP i−1−MIPi)], and before that span (indicated $\Delta PL(i-1)$). The total power loss before the node (i) is marked as NCPLi (non-compensated power loss) being:

$$NCPLi=\Delta PLi-1+(MOPi-1-MIPi);$$

This non-compensated power loss should be further compensated by the gain of the node, if it is an optical amplifier. Also, this value can be used as a reference (NCPLI)ref at the next monitoring session.

To be ready for a case that a particular extra gain value $\Delta GVi$ is ordered to provide a specific output power value at the node ($\Delta GVi \neq 0$ only for amplifiers), the controller computes a so-called gain sum GSi as follows in block 14:

$$GSi=NCPLi+\Delta GVi$$

In other words, if $\Delta GV$ is not zero, block 14 determines the total gain GS which would be desired at the node (be it an amplifier), both to compensate the power losses, and to ensure the required output power.

As has been stated before, the node in our concept is either an amplifier having its controllable gain, or OADM capable of adjusting power of its add channels.

Blocks 16, 18 clarify the type of the node, and in case the node is an amplifier, blocks 20, 22, 24 check whether the gain sum GSi can be covered at node (i) by adjusting its gain Gi and taking into account its maximal gain Gi max and minimal gain Gi min. If the gain sum GSi has been covered by controlling the amplifier's gain, the node (i) sends to the next node (i+1) a message that the $\Delta PLi=0$ (block 26) and a message about the value of the measured output power MOPi at the node (block 28). If the gain sum GSi has not been compensated partially or completely by the change of the nodes' gain, the non-covered portion of the GSi, which is now called $\Delta PLi$ (block 30), will be indicated in a message sent to the next node (block 32). It should be noted, that the value of $\Delta PLi$ can be either positive, or negative, depending on the power loss changes which took place in the chain and depending on the $\Delta GVi$.

In case the node is OADM, the power of add channels (if any) are to be adjusted by the value of (NCPLi)t−1−(NCPLi) (block 34, i.e., by the change of power which took place before the OADM from the time of the last monitoring session) to be equal in power to the through channels.

In case the node is OADM, the value $\Delta PLi$ is also sent to the next node, but it is composed from the value of the preceding $(\Delta PL)i-1$, the power loss on the incoming span (MOPi−1−MIPi) and the internal attenuation of the OADM (TCA) (blocks 36 and 38). Of course, the value of the measured output power MOPi is also sent to the next node (block 28), all the messages being preferably forwarded via the optical supervisory channel OSC.

All adjustments (of amplifier's gain or of add channels' power) are usually performed based on pre-selected thresholds and after expiring predetermined hold-off time intervals.

It should be noted that the flow chart of FIG. 1 illustrates operations performed at the node controller. However, similar operations can be held at a central controller/processor.

The method as is comprises preliminary calibration of power per channel in the chain, including power calibration of OADM add channels.

Figure 2:
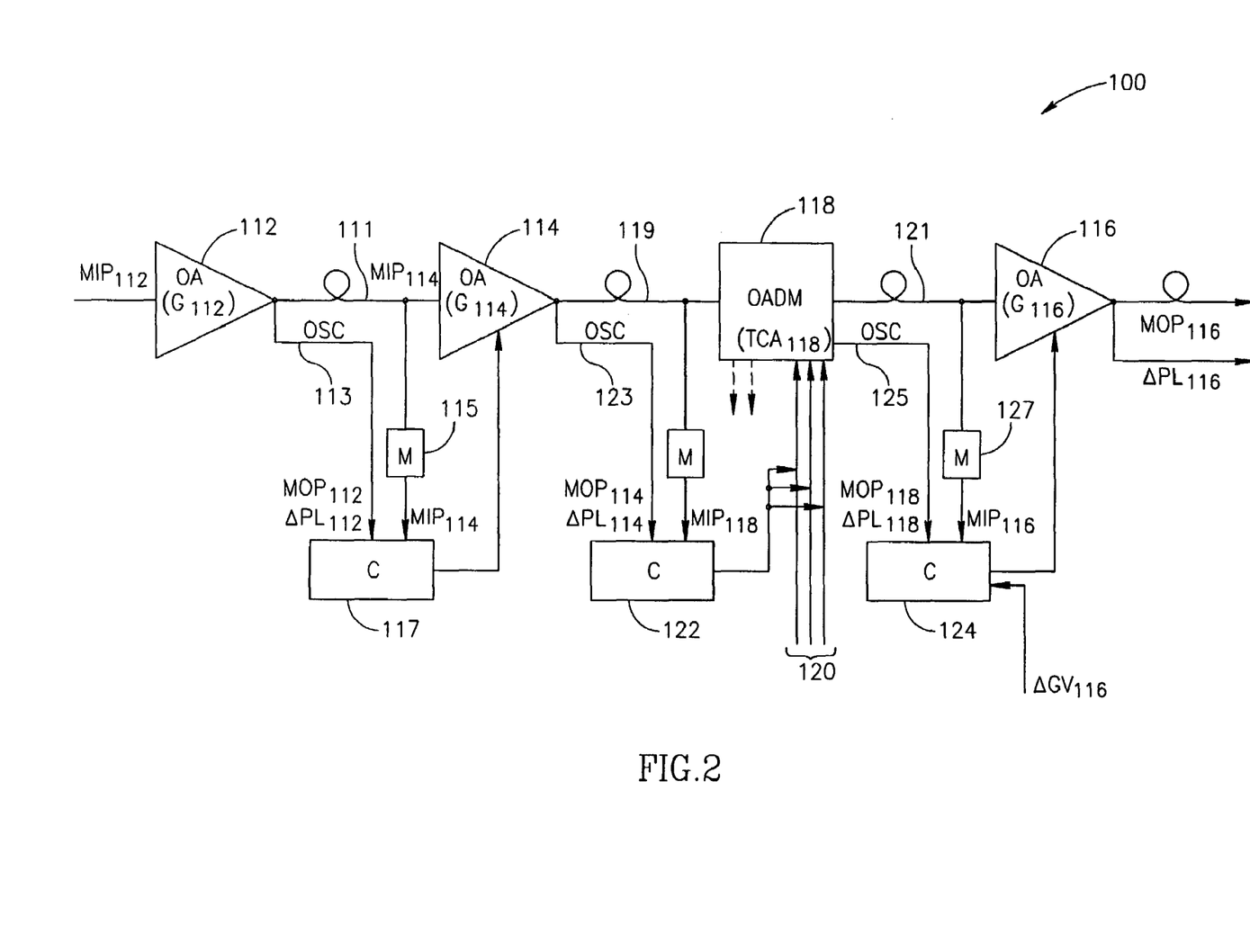
FIG. 2 illustrates an exemplary optical chain and a suitable manner of controlling power in the chain using the proposed method.

The following description, referring to FIG. 2, presents a qualitative example illustrating the above-described principle.

FIG. 2 shows a network chain 110 composed from a number of nodes including amplifiers 112, 114, 116 and an OADM 118 connected between the amplifiers 114 and 116. The nodes are connected by optical spans 111, 119 and 121; the optical spans carry an optical supervisory channel OSC marked 113, 123 and 125, respectively. The OSC is used for transmitting between the nodes various types of messages. According to the invention, the OSC transmits the following two messages from a preceding node to a current node: MOP(i−1) being the message about the value of the output power of the preceding node (i−1), and $\Delta PL(i-1)$ being the message on the span power loss which has not been corrected at the node (i−1).

Each of the nodes is provided with a monitor (M) of the input power, capable of measuring parameter MIP (Measured Input Power) at this particular node. In this example, each node comprises its own controller (C) capable of receiving and processing the readings of the monitor M and the messages (MOP, $\Delta PL$) sent via the OSC from the preceding node.

Suppose the Gain of the amplifier 112 is equal to 20. If the input power of the amplifier 112 (MIP112) is equal to −5 dbM, its output power (MOP112) will be equal to +15 dBm. Suppose, no valid message ΔPL was received at the node 112 from the previous node, so there is no non-corrected power loss at the node 112, and the OSC 113 will transmit two messages from the node 112: one about the value of MOP112 (=15 dBm) and the other message is ΔPL112 (=0). The monitoring sessions can be organized periodically, say once each 5 ms.

Now suppose the span 111 has presently the power loss PL=25 dB which is more than the previously obtained value PL(t−1)=24 dB. Say, the fiber has been bent which fact increased the fiber attenuation. It is "felt" in the change of the input power measured at the amplifier 114 becomes (−10 dBm), so that the non-compensated power loss is NCPL (114)=(MOP12−MIP114)+ΔPL112=15−(−10)+0=+25 dB. To restore the output power sent by the preceding amplifier 112, the next amplifier 114 should ensure an appropriate gain which can be calculated in real time as follows:

$$G114=NCPL(114)=MOP112-MIP114=>=15-(-10)=+25 \text{ dB}.$$

To do that, information about MOP112 sent via the OSC channel 113, and the real time value of MIP 114 can be monitored by a monitor 115, and the obtained real time values can be fed to the controller C marked 117 which issues a command to amplifier 114 to adjust its gain. (The controller 117 and the monitor 115 may form integral part of a printed circuit comprising the amplifier 114.) Suppose, the gain of the amplifier 114 has not completely compensated the span power loss since the maximal gain of the amplifier 114 is limited to G=24. If the gain of node 14 is now equal to 24, the output power of amplifier 114 is now:

MOP114=(−10)+24=14 dBm, and the power loss not corrected at the present node will be: ΔPL114=25−24=1 (dBm).

As can be seen, when non-expected changes occur before the amplifier 114 (say, attenuation of the link 111 fluctuates or there is a non-compensated power at the amplifier 112) thus changing the input power of the amplifier 114, it will immediately (preferably, in less than 50 ms) react to such changes and adjust its gain if still in the frame of the maximal gain, and such adjustment will not require complex calculations and massive data to be collected from the network.

However, as can be seen, due to the limit of the maximal gain of the node 114, the problem of the reduced power per channel remained in the chain. It will be shown below, how the invention allows for compensation of the reduced power by the following nodes in the chain.

The amplifier 114 is connected to the OADM 118 via the optical span 119. The supervisory channel OSC 123 brings to the OADM information that MOP114=14 dBm, and information that ΔPL114=1 dB. Suppose that the MIP118=−10 dBm, i.e. the power loss is equal to 24 dB which is equal to the reference power loss for that span measured at the moment (t−1). In other words, the power loss on the span 119 has not changed. The OADM node is unable to amplify the signal, and no gain corrections are performed here. On the other hand, the OADM node performs adjustment of input power of its add channels 120 (per channel) to be equal to that of the input channels of OADM.

The control unit 122, based on the input information comprising MOP114, MIP118 and ΔPL114, and NCPL118 (t−1) (not shown) enables both correction of the power of add channels 120, and production of messages on MOP118 and ΔPL118 to be sent from the node 118 via the OSC channel marked 125.

Suppose NCPL118(t−1) was 24 dB, and now NCPL118 is 25 dB due to the extra 1 dB appeared at the span 111. Suppose OADM 118 takes care of 3 add channels and 30 through channels. The power of add channels is adjusted, namely the power of each add channel is reduced by 1 dB. Let's consider OADM 118 has through channel attenuation TCA=2.4 dB. Then, the MOP118 will be approximately equal to −12 dBm.

$$\Delta PL118=NCPL118+TCA=25+2.4=27.4 \text{ dB}.$$

The next node in the chain is the amplifier 116 which is capable of amplifying optical signals, and which is also provided with the control unit (124) allowing to receive and process all the input information to regulate its gain.

The data about the output power MOP118 is forwarded to the control block 124 of the amplifier 116 via the OSC channel section 125, together with the message ΔPL118=27.4 dB. The input power MIP116 is monitored by a monitor 127. Let attenuation of the span 121 is 3.6 dB, so when MOP118=−12 dBm, MIP116 occurs to be −15.6 dBm.

MIP 116 is introduced into the controller 124 together with the messages received from the OSC channel 125. In the controller 124, the following calculation is performed, according to which the power loss non-compensated up to the node 116 of the chain, is:

$$NCPL116=MOP118-MIP116+\Delta PL118=-12-(-15.6)+27.4=3.6+27.4=31 \text{ dB}$$

Suppose, at the previous monitoring session the NCPL116 (t−1) was 30 (less by 1 dB). Say, the amplifier 116 has Gmax=33. Let the designer preliminarily stated an extra gain value ΔGV116=2 dB. Now, the gain sum GS116=NCPLi116+ΔGV116=31+2=33 dB. Since the gain sum GS116 equals to Gmax of the amplifier 116, it will produce ΔPL116=0. The above example illustrates how the distributed compensation of power loss changes works.

Should the gain sum GS116 be greater than Gmax of the amplifier 116 for some reason, the amplifier 116 would issue ΔPL118 ≠0, and this non-compensated power loss could be corrected at any following amplifier (not shown in the drawing) having a reserve of the gain range.

It should be appreciated that different embodiments of the system implementing the above-defined method might be proposed, and other numerical examples could be presented, such embodiments are to be considered part of the invention.

The invention claimed is:

1. A method for maintaining a required value of power per optical channel in a chain of optical nodes connected by optical fiber spans, wherein at least some of said nodes including optical amplifiers with controllable gains, the method comprising:
  performing automatic gain control at said optical amplifiers so that, in the frame of power gain of an optical amplifier, to compensate a preceding span loss; said span loss being power loss on an optical fiber span incoming said amplifier;
  obtaining information from a preceding node in the chain about a value of measured output power (MOP) of the preceding node;
  measuring input power (MIP) at a following node;
  obtaining a difference between the MOP of the preceding node and the MIP of the following node to calculate the span loss between the two nodes, wherein the automatic gain control is performed at the amplifier of the following node in response to the calculated span loss; and obtaining, from said preceding node, information about power loss (ΔPL) which has not been compensated at the preceding node, thereby ensuring distributed compensation of power loss changes if occur in one or more spans of the chain.

2. The method according to claim 1, wherein the nodes include said optical amplifiers and one or more Optical Add Drop Multiplexers (OADMs).

3. The method according to claim 2, further comprising a step of preliminary calibration of power of add channels of OADMs constituting nodes of the chain.

4. The method according to claim 2, further comprising the following steps when a fiber cut is detected:
  if the fiber cut is detected in the incoming fiber span of a node being an amplifier, switching the amplifier off and sending a signal Loss Of Signal (LOS) instead of information on the output power;
  if the fiber cut is detected in the incoming fiber span of a node being OADM, keeping add channels of the OADM as adjusted at a previous monitoring session.

5. The method according to claim 1, further comprising a step of preliminary calibration of power per optical channel at a first node in the chain.

6. The method according to claim 1, comprising performing the following steps for an intermediate node "i" of the chain:
  obtaining information on two parameters MOP(i−1) and ΔPL(i−1), the MOP(i−1) being said MOP of the preceding node, and the ΔPL(i−1) being said power loss which has not been compensated at the preceding node;
  obtaining parameter MIP(i) being said MIP of the node "i",
  processing the parameters MOP(i−1), ΔPL(i−1) and MIP(i) to obtain a non-compensated power loss accumulated before the node "i":

$NCPLi=\Delta PLi-1+(MOPi-1-MIPi)$;

in case the node "i" is an optical amplifier, controlling its gain so as to at least partially compensate the obtained non-compensated power loss accumulated before the node "i"(NCPLi),
  producing two parameters MOPi and ΔPLi to be used for the next node "i+1", wherein MOPi is said MOP of the node "i", and ΔPLi is power loss which has not been compensated at the node "i".

7. The method according to claim 6, further comprising a step of pre-setting a particular extra gain value ΔGV for a node comprising an optical amplifier.

8. The method according to claim 7, wherein the step of controlling the gain of the amplifier comprises changing it in the frame of its gain range so as to at least partially cover a gain sum (NCPLi+ΔGV), and
  the step of producing the parameter ΔPLi comprises considering the ΔPLi to be equal to a portion of said gain sum not covered by the change of the amplifier's gain.

9. The method according to claim 6, further comprising, if the node "i" is OADM, considering the parameter ΔPLi to be equal to value NCPLi+TCA, wherein TCA represents through-channels' attenuation of the OADM.

10. The method according to claim 6, further comprising, if the node "i" is OADM, a step of adjusting power of add channels of the OADM in response to obtained value of NCPLi.

11. The method according to claim 10, wherein the step of adjusting power of add channels of OADM comprises comparing the obtained value of NCPLi with a reference value of NCPLi.

12. The method according to claim 10, comprising providing the adjustment of the add channels based on a periodic monitoring and using pre-selected thresholds.

13. The method according to claim 1, wherein the step of obtaining the information and the step of controlling the gain are performed on the basis of periodical monitoring and by using pre-selected thresholds.

14. The method according to claim 1, comprising transmitting said information via OSC (Optical Supervisory Channel).

15. A system for maintaining a required value of power per optical channel in a chain of optical nodes connected by optical fiber spans, wherein at least some of said nodes including optical amplifiers with controllable gains, the system being capable of providing automatic gain control at said optical amplifiers so that, in the frame of power gain of an optical amplifier, to compensate a preceding span loss, wherein said span loss being power loss on an optical fiber span incoming said amplifier,
  the system being operative to:
    obtain information from a preceding node in the chain about a value of measured output power (MOP) of the preceding node,
    measure input power (MIP) at a following node,
    obtain a difference between the MOP and the MIP at the following node to calculate the span loss between the two nodes,
    wherein the automatic gain control is performed at the amplifier of the following node in response to the calculated span loss;
  the system being additionally adapted to:
    provide, for at least one of said optical nodes,
      information from a preceding node in the chain concerning a value of power loss (ΔPL) which has not been compensated at the preceding node, thereby ensuring distributed compensation of power loss changes if occur in one or more spans of the chain.

16. A system for maintaining required power per channel in an optical chain comprising nodes connected by optical fiber spans, wherein the nodes comprise optical amplifiers having gain controllable within the gain range and comprising one or more Optical Add Drop Multiplexers (OADM) capable of regulating power of add channels according to power of incoming channels, wherein an intermediate node "i" being operative to:
  receive information on two parameters MOPi−1 and ΔPLi−1 from its preceding node "i−1", the MOPi−1 being Measured Output Power of the preceding node, and ΔPLi−1 being Power Loss which has not been compensated at the preceding node;
  measure parameter MIPi being Measured Input Power of the node "i",
  process the parameters MOPi−1, ΔPLi−1 and MIPi at the node "i" to obtain a non-compensated power loss accumulated before the node "i":

$NCPLi=\Delta PLi-1+(MOPi-1-MIPi)$;

in case the node "i" is an optical amplifier, to control its gain within its range so as to at least partially compensate the obtained non-compensated power loss accumulated before the node "i"(NCPLi),
  to produce two parameters MOPi and ΔPLi to be sent to the next node "i+1", wherein MOPi is Measured Output Power of the node "i", and ΔPLi is Power Loss which has not been compensated at the node "i", said system thereby enabling distributed compensation of power loss changes if occurred in one or more of said fiber optic spans.

17. The system according to claim 16, capable of presetting an extra gain value ΔGV at a particular amplifier node to allow said particular amplifier to provide a specific output power value in the frame of its gain range; said node being operative to control the gain of said particular amplifier so as to at least partially cover a gain sum (NCPLi+ ΔGV), and operative to produce the parameter ΔPLi equal to a portion of said gain sum not covered by the change of the amplifier's gain.

* * * * *